United States Patent
Yokoyama et al.

(10) Patent No.: US 7,794,888 B2
(45) Date of Patent: Sep. 14, 2010

(54) FUEL CELL SYSTEM

(75) Inventors: Tatsuaki Yokoyama, Susono (JP);
Osamu Yumita, Gotenba (JP); Masaaki Matsusue, Mishima (JP); Takahide Izutani, Susono (JP); Keigo Suematsu, Susono (JP); Shuji Hirakata, Susono (JP); Hiroshi Fujitani, Gotenba (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 12/307,097

(22) PCT Filed: Aug. 2, 2007

(86) PCT No.: PCT/JP2007/065161
§ 371 (c)(1),
(2), (4) Date: Dec. 30, 2008

(87) PCT Pub. No.: WO2008/016106
PCT Pub. Date: Feb. 7, 2008

(65) Prior Publication Data
US 2009/0317675 A1    Dec. 24, 2009

(30) Foreign Application Priority Data
Aug. 4, 2006   (JP) ............................ 2006-212962

(51) Int. Cl.
*H01M 4/00* (2006.01)
*H01M 8/12* (2006.01)
*H01M 2/14* (2006.01)

(52) U.S. Cl. ................. 429/428; 429/408; 429/410; 429/452

(58) Field of Classification Search ............... 429/17, 429/19, 20, 24, 25, 26, 34, 38
See application file for complete search history.

(56) References Cited

U.S. PATENT DOCUMENTS

| 2003/0049501 A1* | 3/2003 | Fujita ............... 429/20 |
| 2003/0126796 A1 | 7/2003 | Hibino et al. |
| 2004/0072050 A1* | 4/2004 | Miura et al. ............... 429/34 |
| 2005/0241233 A1 | 11/2005 | Hibino et al. |

FOREIGN PATENT DOCUMENTS

| JP | 2002-029701 A | 1/2002 |
| JP | 2003-201487 A | 7/2003 |
| JP | 2004-111167 A | 4/2004 |
| JP | 2004-134273 A | 4/2004 |
| JP | 2006-145252 A | 6/2006 |

\* cited by examiner

*Primary Examiner*—Jennifer K Michener
*Assistant Examiner*—Eli S Mekhlin
(74) *Attorney, Agent, or Firm*—Sughrue Mion, PLLC

(57) ABSTRACT

It is an object of the present invention to provide a fuel cell system that is capable of sensing unintended gas leakage from a discharge control means based on odor.
A fuel cell system is provided with a bypass passage 32 connecting a fuel offgas passage 30 at inlet of a odorant removal unit 40 to the fuel offgas passage 30 in the vicinity of outlet of the odorant removal unit 40, and the fuel cell system facilitates the removal of odor from the discharged fuel offgas, by closing a bypass valve 33 in conjunction with opening a purge valve 31, and suppresses the removal of odor, by opening the bypass valve 33 in conjunction with stop of discharge of fuel offgas caused by closing the purge valve 31.

3 Claims, 4 Drawing Sheets

US 7,794,888 B2

FUEL CELL SYSTEM

CROSS REFERENCE TO RELATED APPLICATIONS

This application is a National Stage of International Application No. PCT/JP2007/065161 filed Aug. 2, 2007, claiming priority based on Japanese Patent Application No. 2006-212962 filed Aug. 4, 2006, the contents of all of which are incorporated herein by reference in their entirety.

TECHNICAL FIELD OF THE INVENTION

The present invention relates to a fuel cell system that is equipped with an odor removal means.

BACKGROUND ART

Conventionally, there is a fuel cell system that uses odorized fuel gas as a technique for making hydrogen gas leakage sensible in the fuel cell system. Furthermore, as the fuel cell system that uses odorized fuel gas, there is a fuel cell system that has an expanded range of capability of sensing fuel gas leakage by disposing an odorant removal section on a fuel offgas passage that lets fuel offgas discharged from a fuel cell go therethrough rather than on a fuel gas passage that lets fuel gas go therethrough to the fuel cell as is conventionally done (see Patent Document 1).

Patent Document 1: Japanese Patent Publication No. 2004-134273

SUMMARY OF THE INVENTION

Problem to be Solved by the Invention

By focusing attention on a discharge control means such as a purge valve that controls discharge of fuel offgas from a fuel cell to a fuel offgas passage, it is appreciated that leakage of fuel gas cannot be sensed based on odor of odorant at the time the leakage is occurring under such circumstances that the discharge of fuel offgas should be stopped due to failure of the fuel cell system. This is because as long as there is no leakage occurring in other section, the fuel offgas that leaks from the discharge control means is already removed of odorant at the time it is discharged out of the fuel cell system.

In view of the problems discussed above, it is an object of the present invention to provide a fuel cell system that is capable of sensing unintended gas leakage from a discharge control means based on odor.

Means for Solving the Problem

In order to solve the problems discussed above, the present invention allows unintended gas leakage from a discharge control means to be sensed based on odor, by facilitating removal of odor from fuel offgas in conjunction with start of discharge of fuel offgas and by suppressing removal of odor in conjunction with stop of discharge of fuel offgas.

In detail, the present invention relates to a fuel cell system that is characterized in including:

a fuel cell that uses odorized fuel gas;

a fuel offgas passage that lets fuel offgas from the fuel cell go therethrough;

a discharge control means that is disposed on the fuel offgas passage and controls discharge of the fuel offgas;

an odor removal means that is disposed downstream from the discharge control means on the fuel offgas passage and removes odor from the discharged fuel offgas; and an odor removal control means that facilitates the removal of odor from the discharged fuel off gas performed by the odor removal means in conjunction with the discharge control means performing control to start the discharge of the fuel offgas, and suppresses the removal of odor performed by the odor removal means in conjunction with the discharge control means performing control to stop the discharge of the fuel offgas.

Assuming that the fuel cell's side of the fuel offgas passage is the upstream side, the odor removal means is disposed downstream from the discharge control means.

According to the present invention, by suppressing the removal of odor performed by the odor removal means in conjunction with the discharge control means performing control to stop the discharge of the fuel offgas, it is possible for unintended gas leakage to be sensed based on odor at the time the leakage is occurring under such circumstances that the discharge should be stopped. Additionally, since the removal of odor from the discharged fuel offgas performed by the odor removal means is facilitated in conjunction with the discharge control means performing control to start the discharge of fuel offgas, no odor will be leaked out of the fuel cell system at the time the fuel gas is discharged intentionally.

Additionally, in the present invention, the odor removal control means may also be characterized in: suppressing the removal of odor performed by the odor removal means at a timing after a predetermined time has elapsed since the discharge control means performed control to stop the discharge of the fuel offgas.

Assuming that the removal of odor is suppressed immediately after the discharge control means performed control to stop the discharge of the fuel offgas, the fuel offgas that is not removed of odor may possibly be discharged out of the fuel cell system. Therefore, in the present invention, the removal of odor performed by the odor removal means is suppressed at a timing after a predetermined time has elapsed since the control to stop the discharge of the fuel offgas was performed, thereby preventing the fuel offgas that is not removed of odor from being discharged out of the fuel cell system.

Additionally, in the present invention, the odor removal control means may also be characterized in having:

a branch passage that diverts the fuel offgas away from the odor removal means; and a branch valve that is disposed on the branch passage and controls opening and closing of the branch passage, wherein the branch valve is closed in conjunction with the discharge control means performing control to start the discharge of the fuel offgas, and is opened in conjunction with the discharge control means performing control to stop the discharge of the fuel offgas, thereby controlling facilitation and suppression of the removal of odor from the discharged fuel offgas performed by the odor removal means.

According to the present invention, at the time the removal of odor is to be suppressed, the branch passage is opened to ensure a passage for the gas not to be removed of odor to go therethrough, thereby suppressing the removal of odor.

Additionally, in the present invention, the odor removal control means may also be characterized in: closing the branch valve before a time elapses, the time being a period of time that is required for the fuel offgas, which is discharged in response to the discharge control means performing control to start the discharge of the fuel offgas, to reach the branch valve, and opening the branch valve at a timing after a time has elapsed since the discharge control means performed control to stop the discharge of the fuel offgas, the time being a period of time that is required for the removal of odor from the remaining fuel offgas within the fuel offgas passage and within the branch passage.

At the time the discharge of the fuel offgas is to be started, it is preferable that the branch valve be closed before the discharged fuel offgas goes through the passage and reaches the branch valve. Additionally, at the time the discharge of the fuel offgas is to be stopped, it is preferable that the branch valve be opened at a timing after a predetermined time that is required for the removal of odor from the remaining fuel offgas within the passage has elapsed, in order to prevent the fuel offgas existing within the passage from being discharged out of the fuel cell system without having been removed of odor. At this time, since the time that is required for the fuel offgas to go through the passage and reach the branch valve and the time that is required for the removal of odor from the remaining fuel offgas within the passage may vary depending on the length and the like of the passage, it is preferable that optimum values be used as appropriate according to each mode for embodying the invention.

EFFECT OF THE INVENTION

With the present invention, it is possible to provide a fuel cell system that is capable of sensing unintended gas leakage from a discharge control means based on odor.

BEST MODE FOR EMBODYING THE INVENTION

An embodiment of a fuel cell system according to the present invention will now be described based on the drawings.

Figure 1:
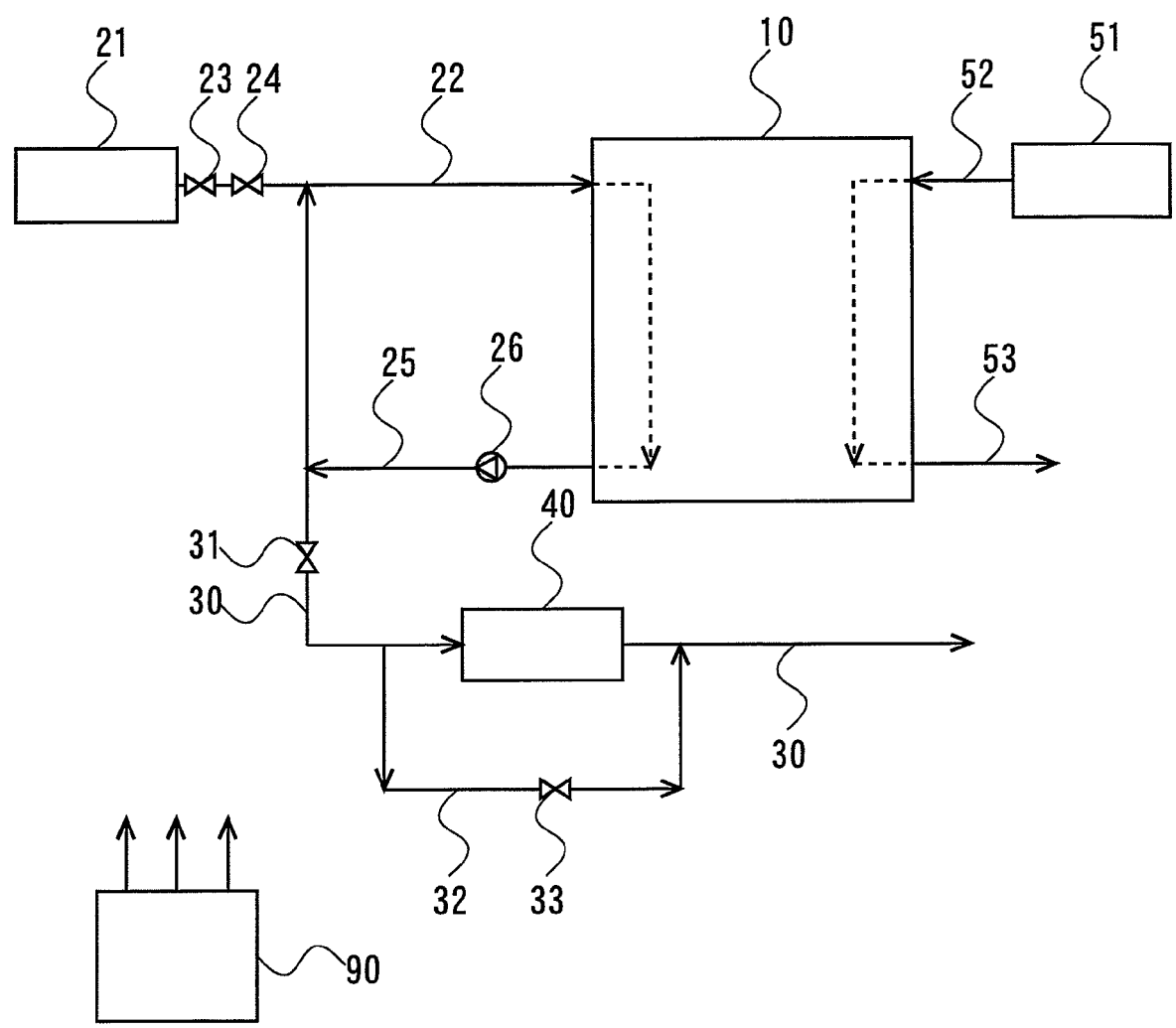
FIG. 1 is an illustration showing the schematic view of configuration of a fuel cell system in an embodiment.

FIG. 1 is an illustration showing the schematic view of configuration of a fuel cell system in the present embodiment. The fuel cell system includes: a fuel cell 10; a gas tank 21 that stores odorized fuel gas; a fuel gas passage 22; a circulation passage 25; a fuel offgas passage 30; an odorant removal unit 40; an air blower 51; an oxidation gas passage 52; an oxidation offgas passage 53; a bypass passage 32; and an electronic control unit (hereinafter referred to as "ECU") 90. The fuel cell system performs generation of electric power by carrying out electrochemical reaction within the fuel cell 10, between fuel gas supplied from the gas tank 21 via the fuel gas passage 22 and oxidation gas supplied from the air blower 51 via the oxidation gas passage 52.

A pressure reduction valve 23 and a flow control valve 24 are disposed on the fuel gas passage 22. The fuel gas supplied from the gas tank 21 to the fuel cell 10 has its pressure reduced to a predetermined level by the pressure reduction valve 23 and has its flow rate adjusted by the flow control valve 24, and then is supplied to the fuel cell 10 via the fuel gas passage 22. The fuel gas that has gone through the fuel cell 10 is then discharged to the circulation passage 25.

A circulation pump 26 is disposed on the circulation passage 25. The use of the circulation pump 26 allows the fuel gas discharged from the fuel cell 10 to be returned to the fuel gas passage 22, thereby increasing a flow rate per unit time of the hydrogen gas supplied to the fuel cell 10.

A purge valve 31 is disposed on the fuel offgas passage 30. The fuel gas will have a reduced hydrogen gas concentration within the gas after circulation. Therefore, control of the purge valve 31 causes the fuel offgas with a reduced hydrogen gas concentration to be discharged from the circulation passage 25 into the fuel offgas passage 30, and control of the flow control valve 24 causes the fuel gas with a high hydrogen gas concentration to be supplied from the gas tank 21.

The odorant removal unit 40 is disposed in the downstream part of the fuel offgas passage 30 and removes odorant from the fuel offgas entering from the fuel offgas passage 30. An adsorptive medium (not shown) is provided to the odorant removal unit 40, such that the odorant contained in the gas going through the odorant removal unit 40 can be adsorbed and removed by the adsorptive medium.

The bypass passage 32 is a gas passage that connects the fuel offgas passage 30 at inlet of the odorant removal unit 40 to the fuel offgas passage 30 in the vicinity of outlet of the odorant removal unit 40. A bypass valve 33 is disposed on the bypass passage 32, such that a part of the fuel offgas diverts away from the odorant removal unit 40 while the bypass valve 33 is in an opened state.

In addition to a CPU, the ECU 90 also includes a ROM, a RAM, and the like to store various programs and maps which will be described later, and controls each element of the entire fuel cell system. Opening and closing of the purge valve 31, the pressure reduction valve 23, the flow control valve 24, and the bypass valve 33 are controlled by the ECU 90.

Figure 2:
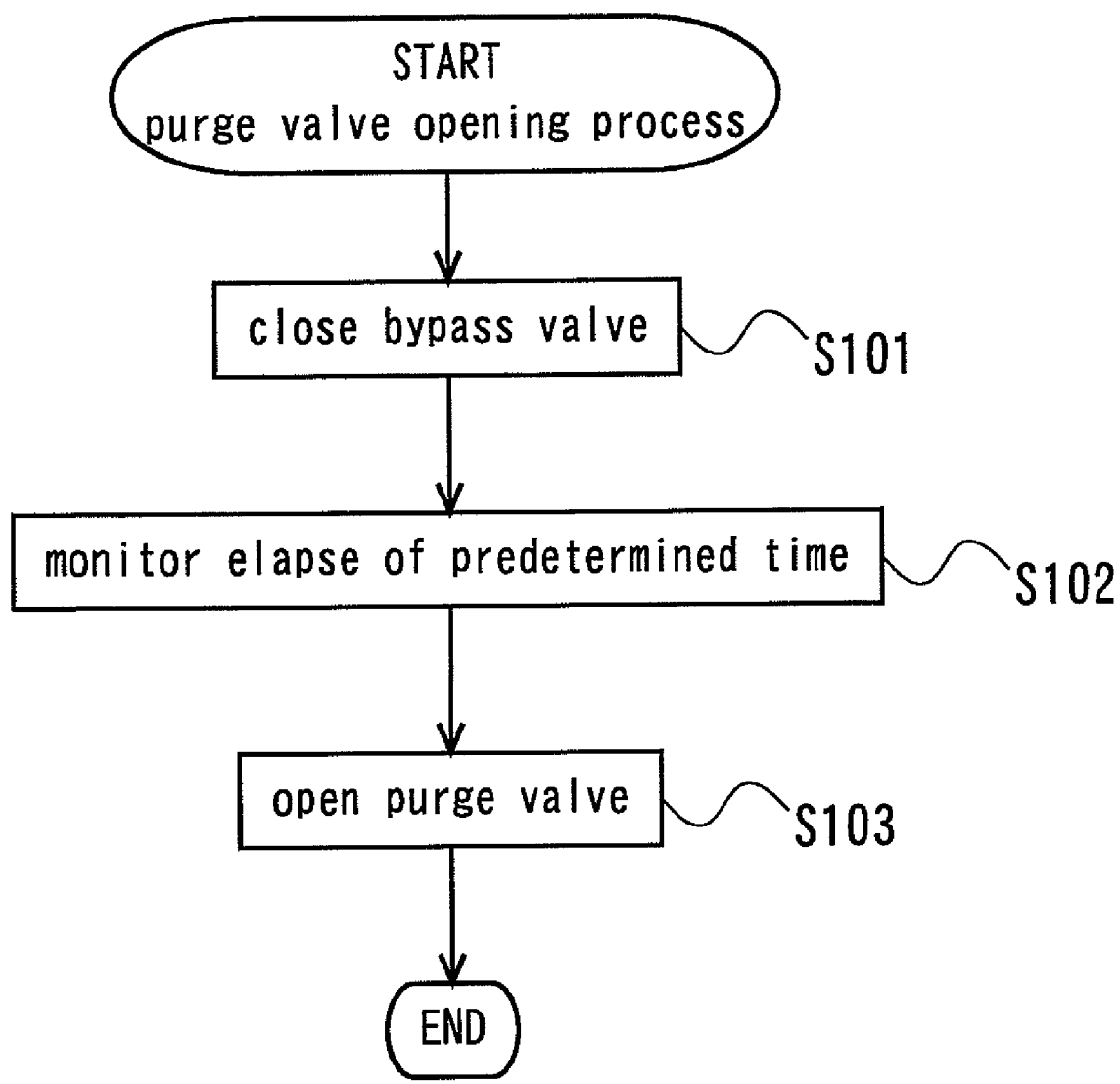
FIG. 2 is an illustration showing the flow of control of a purge valve opening process in the embodiment.
Figure 3:
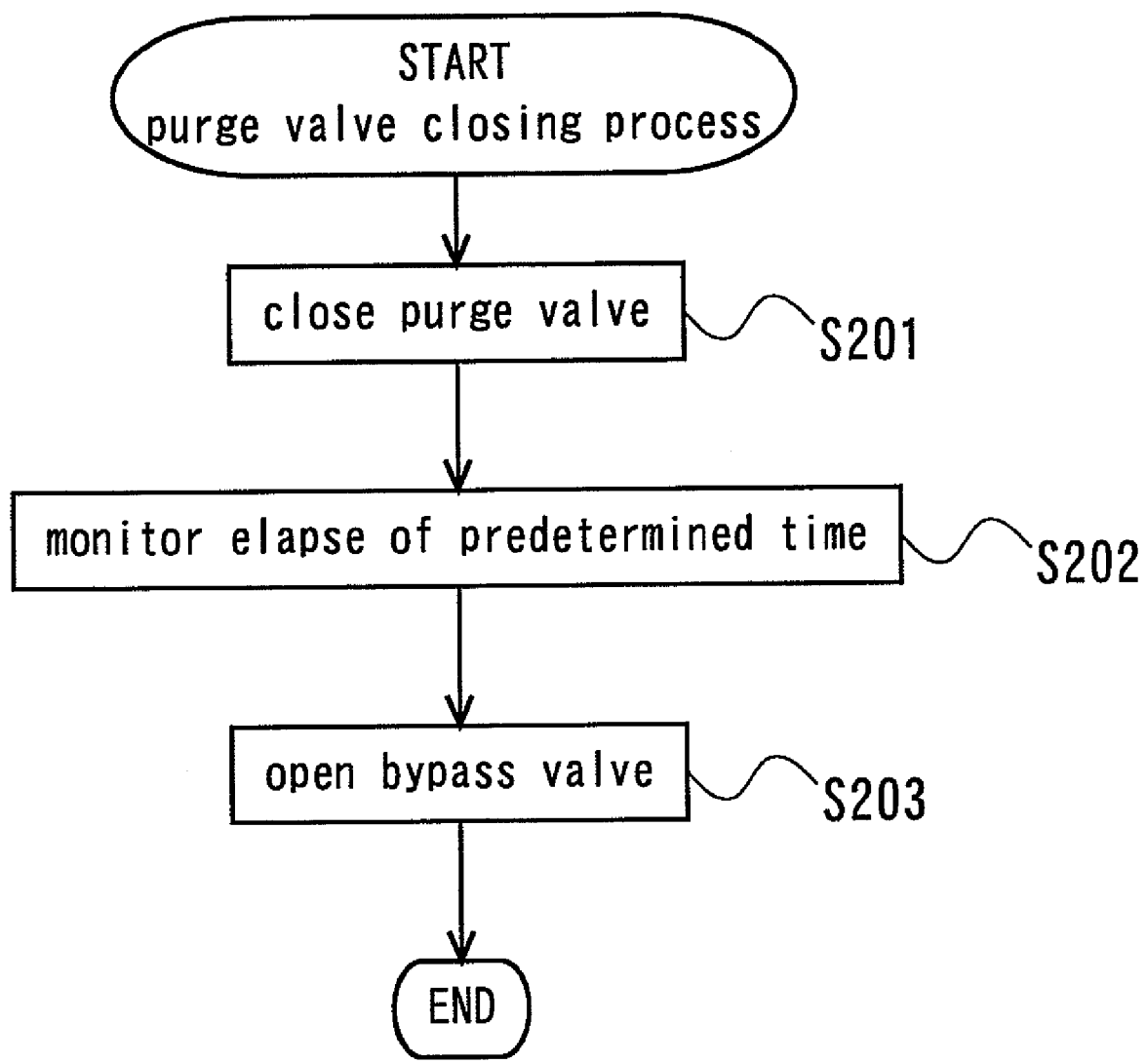
FIG. 3 is an illustration showing the flow of control of a purge valve closing process in the embodiment.
Figure 4:
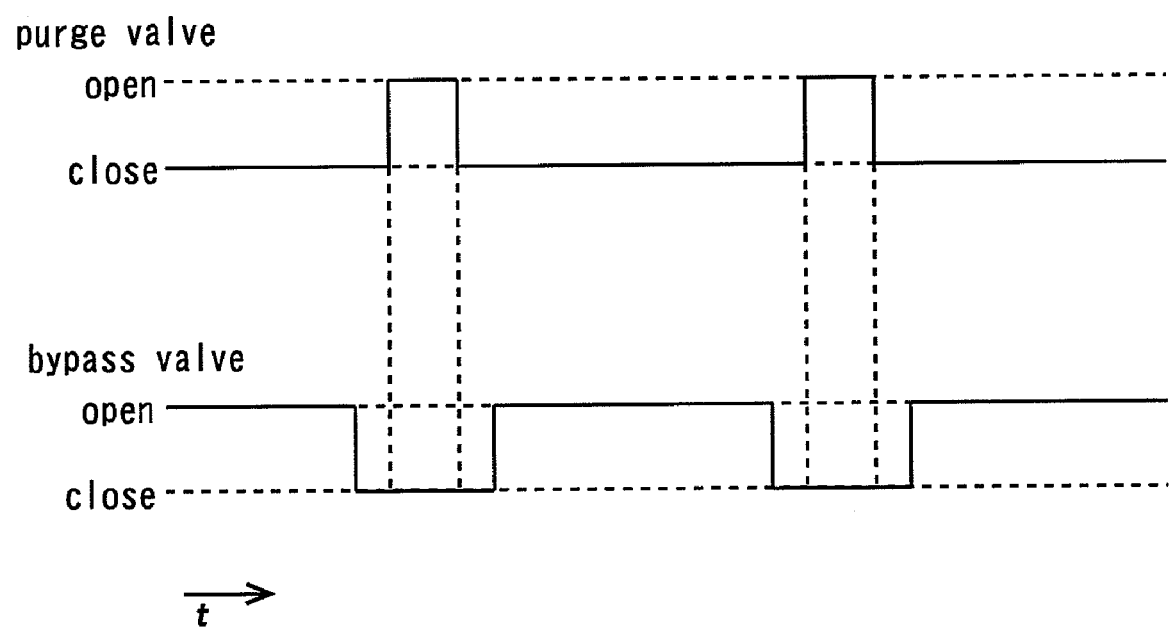
FIG. 4 is an illustration showing state transitions of a purge valve and a bypass valve at the time the purge valve opening process and the purge valve closing process are performed while the fuel cell system is in operation in the embodiment.

The flow of control of the fuel cell system is now described by using FIGS. 2 through 4. The control described below is carried out by controlling each section making up the fuel cell system by using the ECU 90.

FIG. 2 is an illustration showing the flow of control of a purge valve opening process in the present embodiment. As described previously, the fuel cell system controls opening and closing of the purge valve 31 for the purpose of, such as, adjusting a hydrogen gas concentration within the fuel gas used for generation of electrical power. The control shown in the present flowchart is started by the ECU 90 once it is determined that the fuel gas is required to be discharged from within the circulation passage 25, such as, for example, once the ECU 90 has detected a reduction of hydrogen gas concentration within the circulation passage 25.

The bypass valve 33 is closed in S101. This is because the bypass valve 33 is required to be closed before the purge valve 31 is opened, in order to prevent the odorized fuel gas from being discharged out of the fuel cell system. The ECU 90 controls and closes the bypass valve 33. Thereafter, the process proceeds to S102.

In S102, an elapse of predetermined time is monitored. The ECU 90 monitors an elapse of predetermined time (for example, 100 milliseconds) since the bypass valve 33 was closed. Thereafter, the process proceeds to S103.

In S103, the purge valve 31 is opened. The ECU 90 controls and opens the purge valve 31. Thereafter, the process shown in the present flowchart ends.

The process of S102 is a process for preventing the odorized fuel gas discharged from the purge valve 31 from being discharged out of the fuel cell system, and may not necessarily monitor an elapse of predetermined time. Additionally, although the purge valve 31 is opened after the bypass valve 33 is closed in the present embodiment, the bypass valve 33 may be closed and the purge valve 31 may be opened both at the same time, or the purge valve 31 may be opened first and the bypass valve 33 may then be closed before a time that is required for the discharged fuel offgas to go through the fuel offgas passage 30 and reach the bypass valve 33 elapses. This is because, as long as the bypass valve 33 is closed before the fuel offgas discharged in response to the opening of the purge valve 31 goes through the fuel offgas passage 30 and reaches the bypass valve 33, no odorized fuel offgas will be discharged out of the fuel cell system.

FIG. 3 is an illustration showing the flow of control of a purge valve closing process in the present embodiment. The control shown in the present flowchart is started by the ECU 90 in cases such as, the discharge of fuel gas from within the circulation passage 25 is to be stopped, the purge valve 31 is required to be closed in order for the fuel cell system to stop, and the like.

In S201, the purge valve 31 is closed. Once the purge valve 31 is closed, the discharge of fuel offgas toward the side of the odorant removal unit 40 and the bypass passage 32 is stopped. The ECU 90 controls and closes the purge valve 31. Thereafter, the process proceeds to S202.

In S202, an elapse of predetermined time is monitored. The ECU 90 monitors an elapse of predetermined time (for example, 100 milliseconds) since the purge valve 31 was closed. As for this predetermined time, a period of time, which is required for the odorant removal unit 40 to sufficiently remove odorant contained in the fuel offgas present within the fuel offgas passage 30 since the purge valve 31 was closed, is set in advance. That is to say, the predetermined time may vary depending on factors such as the length of the fuel offgas passage 30 from the point of the purge valve 31 on, and the like. After the predetermined time elapsed, the process proceeds to S203.

In S203, the bypass valve 33 is opened. The ECU 90 controls and opens the bypass valve 33. Since odorant of the fuel offgas that was remaining within the fuel offgas passage 30 at the time the purge valve 31 was closed in S201 has been removed within the predetermined time for which an elapse has been monitored in S202, no odorized fuel offgas will be discharged out of the fuel cell system. Thereafter, the process shown in the present flowchart ends.

FIG. 4 is an illustration showing state transitions of the purge valve 31 and the bypass valve 33 at the time the purge valve opening process and the purge valve closing process are performed while the fuel cell system is in operation in the present embodiment. The horizontal axis indicates elapse of time; whereas the longitudinal axis indicates states of the purge valve 31 and the bypass valve 33. At the time the purge valve 31 is to be opened, the bypass valve 33 is closed before the purge valve 31 is opened. At the time the purge valve 31 is to be closed, the bypass valve 33 is opened after a period of time that is required to remove odorant of the fuel offgas within the fuel offgas passage 30 has elapsed since the purge valve 31 was closed.

According to the present embodiment, by opening the bypass valve 33 while the purge valve 31 is closed, it is possible to sense unintended gas leakage from the purge valve 31 based on odor of odorant. Since the bypass valve 33 is closed while the purge valve 31 is in an opened state, no odor of odorant will be leaked out of the fuel cell system at the time no failure is occurring in the purge valve 31. Additionally, the present invention also allows unintended gas leakage from the purge valve 31 to be sensed not only at the time the fuel cell system is in operation but also at the time the fuel cell system is in a stopped state.

In performing the present invention, the method for suppressing the removal of odorant may not necessarily be the bypass passage 32 nor the bypass valve 33 as presented in the present embodiment. For example, a branch offgas passage that branches at the vicinity of inlet of the odorant removal unit 40 and does not return to the fuel offgas passage and a branch valve that controls opening and closing of this branch offgas passage may be provided, or alternatively, a method for controlling the removal function of the odorant removal unit 40 itself may be adopted. In case where the branch offgas passage is adopted, it is preferable that a hydrogen dilutor be provided at both the fuel offgas passage and the branch offgas passage.

The invention claimed is:

1. A fuel cell system that is characterized in comprising:
   a fuel cell that uses odorized gas;
   a fuel offgas passage that lets fuel offgas from the fuel cell go therethrough;
   a discharge control unit that is disposed on the fuel offgas passage and controls discharge of the fuel offgas;
   an odor removal unit that is disposed downstream from the discharge control unit on the fuel offgas passage and removes odor from the discharged fuel offgas; and
   an odor removal control unit that facilitates the removal of odor from the discharged fuel offgas when the discharge control unit starts discharge of the fuel offgas, and suppresses removal of odor when the discharge control unit stops the discharge of the fuel offgas
   wherein the odor removal control unit comprises:
      a branch passage that diverts the fuel offgas away from the odor removal unit; and
      a branch valve that is disposed on the branch passage and controls opening and closing of the branch passage; and
      wherein the branch valve is closed in conjunction with the discharge control unit starting the discharge of the fuel offgas, and wherein the branch valve is opened in conjunction with the discharge control unit stopping the discharge of the fuel offgas, thereby controlling facilitation of the removal of odor and suppression of the removal of odor from the discharged fuel offgas.

2. A fuel cell system in accordance with claim 1, characterized in that:
   the odor removal control unit suppresses the removal of odor performed by the odor removal unit at a timing after a predetermined time has elapsed since the discharge control unit performed control to stop the discharge of the fuel offgas.

3. A fuel cell system in accordance with claim 1, characterized in that:
   the odor removal control unit closes the branch valve before a time elapses, the time being a period of time that is required for the fuel offgas, which is discharged in response to the discharge control unit performing control to start the discharge of the fuel offgas, to reach the branch valve, and opens the branch valve at a timing after a time has elapses since the discharge control unit performed control to stop the discharge of the fuel offgas, the time being a period of time that is required for the removal of odor from the remaining fuel offgas within the fuel offgas passage and within the branch passage.

* * * * *